May 15, 1945.　　　　　M. WALTER　　　　　2,376,296
TRACTOR AND LIFT TRAILER COMBINATION
Filed April 21, 1943　　　2 Sheets-Sheet 1
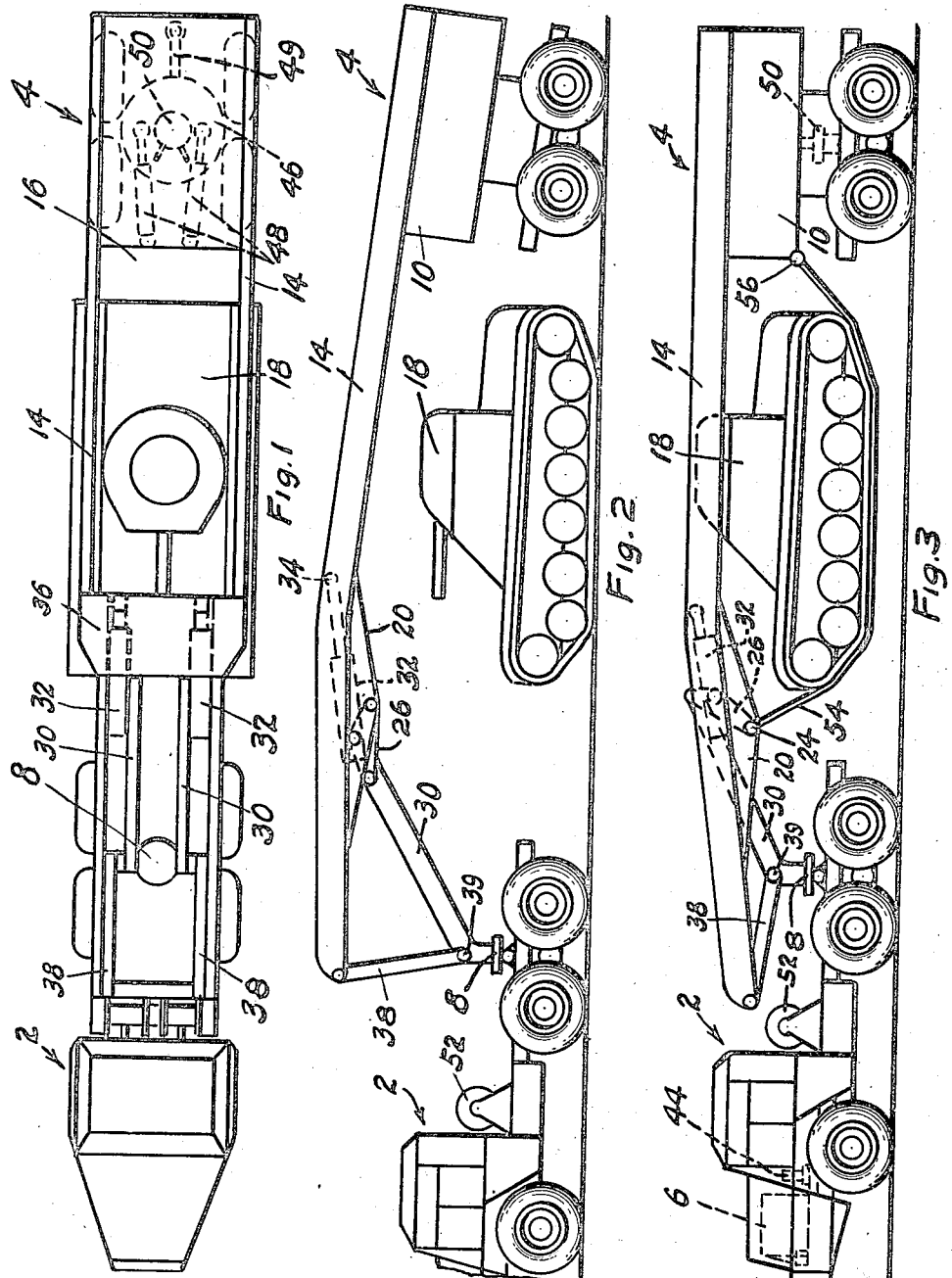
WITNESS:
INVENTOR.
Maurice Walter
BY Hoguet, Neary & Campbell
ATTORNEYS.

May 15, 1945.　　　　M. WALTER　　　　2,376,296
TRACTOR AND LIFT TRAILER COMBINATION
Filed April 21, 1943　　　2 Sheets-Sheet 2
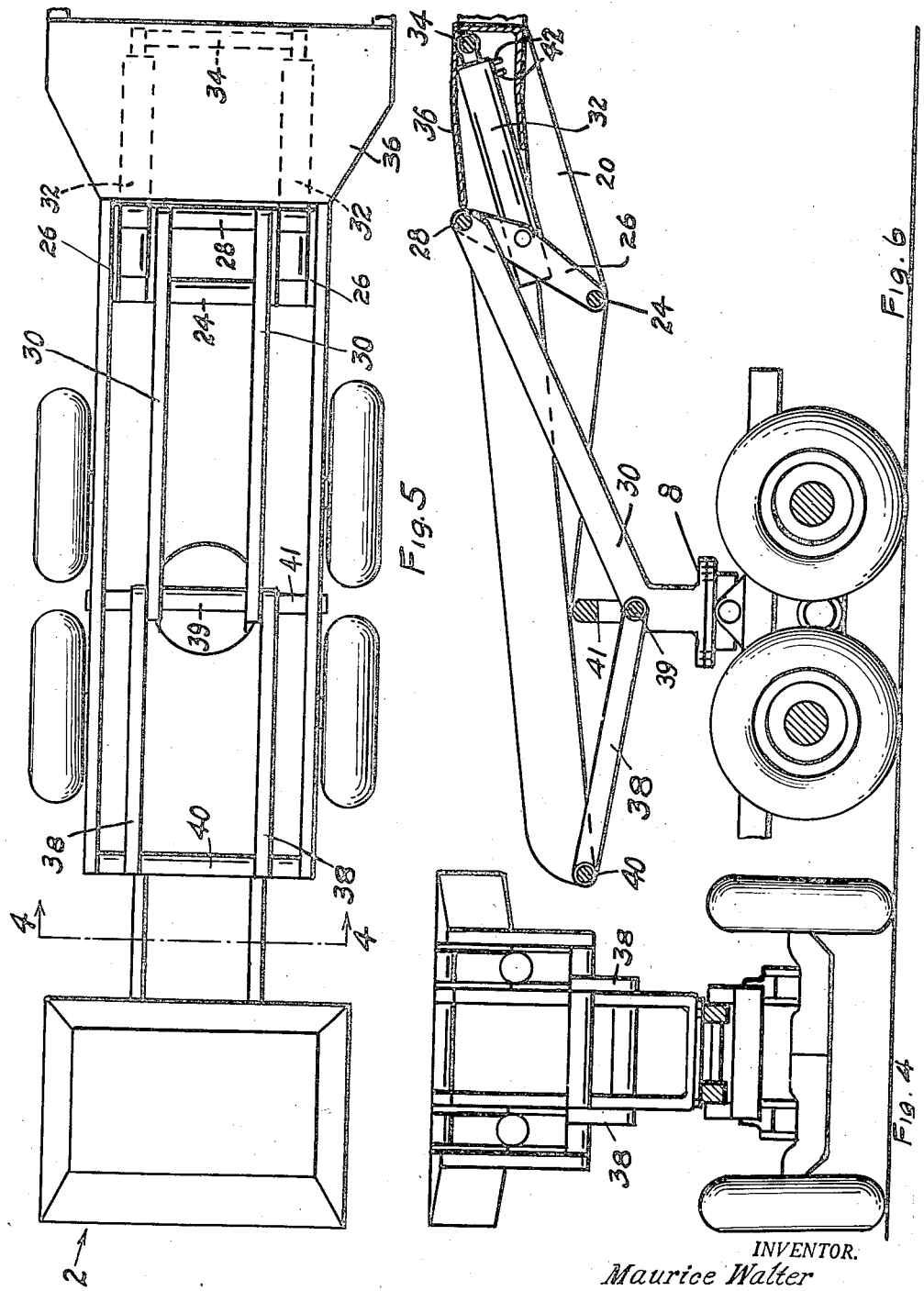
INVENTOR.
Maurice Walter
BY Hoguet, Neary & Campbell
Attorneys Patented May 15, 1945

2,376,296

UNITED STATES PATENT OFFICE 2,376,296

TRACTOR AND LIFT TRAILER COMBINATION

Maurice Walter, New York, N. Y.

Application April 21, 1943, Serial No. 483,855

8 Claims. (Cl. 214—65)

This invention relates to tractor-trailer combinations and particularly to constructions whereby the frame of the trailer may be raised and lowered to lift and transport objects.

The invention is of general application but is hereinafter described with particular reference to its use in salvage operations such as those involved in the recovery and repair of tanks, guns, trucks and other equipment under war conditions.

Heretofore in salvaging a tank or gun it has generally been necessary to use a platform type of trailer and to haul the object up onto the platform of the trailer in order that it may be carried to a repair station. This is especially difficult if the tracks or wheels of the equipment have been injured and will not move. Furthermore, the platform itself must be of very heavy construction to support the equipment and must have sufficient ground clearance to travel over rough terrain, with the result that the top of the tank or gun when loaded on the platform may be too high to pass through tunnels or beneath other overhead structures. The weight of the loaded combination also may be too great to pass over light bridges.

In accordance with the present invention these difficulties and objections to constructions of the prior art are overcome by providing a tractor-trailer combination with an overhead frame from which slings or other carrying means extend downward to lift and carry objects in a suspended manner. No platform is required and the frame may be made lighter than heretofore and may be formed with openings through which the upper portion of a tank or gun may project so that the over-all height of the loaded trailer need only exceed the height of the equipment by the necessary road clearance.

The invention further provides means for both raising and lowering the trailer frame and for lengthening and shortening the wheel base of the combination. In this way manipulation of the combination into place to raise the equipment is simplified and the whole salvaging operation is greatly speeded up.

One of the objects of the present invention is to provide novel tractor-trailer combinations of a sling type.

Another object of the invention is to provide a tractor-trailer combination in which the frame of the trailer may be raised and lowered to lift an object from the ground.

A further object of the invention is to provide a tractor-trailer combination with means for varying the length of the wheel base and to simplify manipulation of the trailer with respect to an object to be carried thereby.

Other objects of the invention are to provide a tractor-trailer combination which is easy to manipulate, relatively light in weight, provides adequate road clearance and a minimum overall height when loaded.

These and further objects and features of the invention will appear from the following description thereof in which reference is made to the figures of the accompanying drawings.

In the drawings:

Fig. 1 is a top plan view of a typical tractor-trailer combination embodying the present invention;

Fig. 2 is a side elevation of the construction shown in Fig. 1 with the trailer frame raised;

Fig. 3 is a view similar to Fig. 2 showing the trailer frame in a lowered carrying position;

Fig. 4 is a vertical sectional view of the construction shown in Figs. 1, 2 and 3 taken on the line 4—4 of Fig. 5;

Fig. 5 is an enlarged plan view of a portion of the trailer frame and tractor, showing the connection therebetween, and Fig. 6 is an enlarged elevation of that portion of the combination shown in Fig. 5.

In that form of the invention illustrated in the figures of the drawings, the combination embodies a tractor indicated generally at 2 and a trailer of the semi-trailer type indicated at 4. The tractor shown is of conventional construction and by preference is provided with multiple axles and all wheels may be driven to provide the necessary traction, although a crawler or other type of traction means may be used and driven by an engine 6 located beneath the hood of the tractor. The rear of the trailer 4 is similarly provided with multiple axles and wheels, although it too may be provided with crawler tracks or similar traction means. The trailer is connected to the tractor by means including a fifth wheel 8 which may be of a pivoted type to facilitate manipulation of the trailer and its load.

The rear portion of the trailer is provided with a box-like construction 10 which houses hydraulic or other steering mechanism, and the like shown in dotted lines in Fig. 1 and provides a storage space for jacks, shovels, crowbars and other salvage tools. From the upper portion of the construction 10 an elevated frame 14 extends forward to the tractor. The frame is formed of beams or channel iron presenting a strong light structure having a central opening 16 through which the upper portion of a tank 18, or other equipment may project. The forward end of the frame is reinforced by downwardly projecting strengthening members 20.

A crossbar 24 extends between the reinforcing members 20 and is pivotally connected to the lower ends of operating links 26. The upper ends of these links are pivotally connected at 28 to rearwardly extending arms 30 carried by the fifth wheel 8, and extensible hydraulic means 32 are interposed between the links 26 and frame 14 and connected to the links 26 between the crossbar 24 and pivots 28 on the arms 30. The opposite ends of the extensible means are connected to the frame 14 at 34 on a reinforcing cross member 36. Lifting links 38 which are considerably longer than the operating links 26 are connected to the lower portions of the arms 30 on the fifth wheel at 39 and are connected at their opposite ends to the cross bar 40 near the end of the frame 14. With this construction the links 26 and 38 are movable in vertical planes to raise and lower the trailer frame with respect to the tractor upon operation of the extensible hydraulic means 32. The hydraulic means are connected by suitable conduits 42 to a hydraulic pump 44 actuated by the engine 6 which drives the wheels or traction means.

When the frame is in the lowered position of Figs. 1 and 6, and the hydraulic means 32 are contracted, the application of hydraulic pressure to the means 32 serves to extend the means forcing the frame 14 rearwardly away from the arms 30 of the fifth wheel on the tractor. At the same time the links 26 and 38 rotate in opposite directions about their points of attachment to the arms 30 and in vertical planes to raise the frame 14 from the lowered position of Fig. 3 to the elevated position of Fig. 2. The movement of the longer lifting link 38 from a substantially horizontal position to a nearly vertical position, and the movement of link 26 rearwardly also serves to separate the tractor and trailer so that the wheel-base of the combination is increased as the frame is raised. The trailer frame is then in position to be moved over the tank or other equipment to be salvaged so that it will clear the equipment and can be lowered into place about the upper portion thereof. At the same time the extended wheel-base of the combination provides sufficient clearance between the tractor and trailer to permit easy maneuvering of the combination and trailer frame with respect to the equipment.

As shown in Fig. 1 the trailer may be provided with independent steering means in the form of the wheel 46 and hydraulic steering elements 48 connected through conduits, not shown, so as to receive fluid under pressure from the pump 44 and engine 6. A lock 49 is provided for holding the wheel 46 in centered position during ordinary travel of the combination. Similarly hydraulic means 50 connected to pump 44 may be used to raise the rear end of the frame 14 with respect to the rear wheels of the tractor, if desired, but it is usually preferable to elevate the frame only at the front end thereof. The winch 52 carried by the tractor also may be hydraulically actuated through suitable conduits supplied with fluid under pressure from the pump 44.

The carrying means by which the equipment to be salvaged is supported may be of any suitable type but is shown at 54 to consist of a sling, one end of which is connected at 56 to the construction 10 of the trailer while the other end of the sling is connected to the cross bar 24 attached to the lower ends of the actuating links 26. The sling may be formed of cables, bars or hangers capable of extending beneath the equipment or connected thereto to raise the equipment and support it during travel of the combination.

It will be noted that when the frame 14 is in its lowered or traveling position the actuating links 26 extend nearly vertically downward from their points of connection with the arms 30 on the fifth wheel. The fifth wheel may, if desired, carry a stop or cross member 41 upon which the frame will rest when in the lowered position, so that the weight of the frame and load is transferred directly to the fifth wheel and to the tractor. With this construction it is not necessary to maintain hydraulic pressure on the extensible means 32 to support the equipment during travel. Moreover, the lifting links are then in a nearly horizontal position so that they transmit the pull or push directly to the fifth wheel of the trailer frame.

In operating the combination and after driving up to the equipment to be salvaged the frame 14 is raised and the wheel-base extended by supplying fluid under pressure to the hydraulic means 32. The actuating links 26 then move in a counter-clockwise direction as seen in the drawings, while the lifting link 38 moves in a clockwise direction to raise the front end of the frame and move the trailer and tractor apart. The combination is then maneuvered to position the frame over the equipment and in this operation the driving and steering means carried by the trailer may be actuated to swing the trailer frame quickly into place. When positioned, the rear steering mechanism is locked in centered position and the frame 14 is lowered by releasing the pressure on the hydraulic means 32. The slings 54 are then positioned beneath the equipment or otherwise connected thereto and the frame 14 is then raised by again forcing fluid under pressure into the extensible hydraulic means 32.

If desired or necessary the combination may be driven away with the frame and equipment thus raised since the links 26 and 38 provide a continuous stable connection between the tractor and trailer. However, the overall height of the combination is relatively great and therefore it is preferable, after first lifting the equipment, to hold it in raised position by jacks, blocks or otherwise and then to lower the frame 14 again about the equipment so that the slings may be shortened to hold the equipment at the desired height to provide road clearance while the frame is in its lowered position. Thereafter, the frame may be raised to lift the equipment from the blocks or jacks and subsequently lowered to the traveling position of Fig. 3, in which the frame rests on cross member 41. The combination with its load then can be driven to a salvage or repair depot. The overall height of the combination and its load is then reduced to a minimum and may not exceed the height of the equipment plus the road clearance. It can therefore pass through tunnels or beneath overhead structures of limited height. Furthermore, when traveling over rough terrain the equipment may be raised while traveling to clear any obstructions that might engage the equipment. The weight of the loaded combination is substantially less than that of previous salvage devices so that it may pass over bridges of limited capacity and when necessary the frame may be raised and the wheel base thus extended to effect greater distribution of the weight on the bridge. On the other hand, during normal travel with the frame lowered, the center of gravity of the loaded combination is relatively low so that the necessary stability of the construction is obtained without materially increasing the width of the tractor and trailer beyond that of conventional road equipment.

On reaching its destination the equipment may be lowered by supporting it upon jacks, raising the frame and lengthening the slings followed by lowering the frame to set the equipment in place.

The sling may be connected to the winch 52 and thereby utilized to raise and lower the equipment without the use of jacks and either or both ends of the frame may be raised and lowered by hydraulic means. It will also be evident that the frame and links may be actuated by mechanical or electrical mechanism if desired and numerous other changes and modifications may be made in the form, arrangement and construction of the elements of the combination without departing from the spirit and scope of the invention.

In view thereof it should be understood that the embodiment of the invention shown in the drawings and particularly described above is intended to be illustrative only and is not intended to limit the scope of the following claims.

I claim:

1. A tractor-trailer combination including a tractor having a power plant, a semi-trailer frame with means thereon for receiving a load, means connecting the frame to the tractor, and extensible means actuated by said power plant and connected to the frame and tractor and movable upwardly and rearwardly with respect to the tractor to raise the frame and load and to increase the wheel base of the combination.

2. A tractor-trailer combination comprising a tractor having a power plant, a member pivotally mounted on the tractor for movement in a vertical plane, a semi-trailer having a frame connected to said member, means on said frame for receiving a load and means actuated by said power plant for moving said member to lower the trailer frame and load and to move it horizontally with respect to said tractor to decrease the wheel base of the combination.

3. A tractor-trailer combination comprising a tractor having a power plant, an arm pivotally connected to said tractor and movable in a vertical plane from a substantially horizontal position to a substantially vertical position, a semi-trailer having a frame connected to said arm, means on said frame for receiving a load and means actuated by said power plant for moving said arm to raise the trailer frame and load and to increase the wheel base of the combination and to lower the trailer frame and load and decrease the wheel base of the combination.

4. A tractor-trailer combination comprising a tractor with a fifth wheel thereon, a pivoted link connected to said fifth wheel and movable in a vertical plane, a semi-trailer having a frame connected to said link and movable thereby to raised and lowered positions, and hydraulic means connected to the link and operable to move the same to lower the trailer frame and move it forward with respect to said fifth wheel.

5. A tractor-trailer combination comprising a tractor having a motor and a hydraulic pump actuated by the motor, a fifth wheel on the tractor, lifting means mounted on said fifth wheel and pivotally movable relative thereto from a substantially horizontal position to a substantially vertical position, a semi-trailer having an elevated frame connected at its front end to the lifting means on the fifth wheel, means connected to the frame for suspending equipment therefrom, and hydraulic means actuated by fluid from said pump and connected to said frame and lifting means to raise and lower the front end of the frame and thereby lift and lower equipment suspended from the frame.

6. A tractor-trailer combination comprising a tractor with a fifth wheel thereon, a semi-trailer having an elevated frame with means for suspending equipment therefrom, a link connected to said frame and fifth wheel, and means for moving said frame upwardly and rearwardly from a lowered, traveling position in which said link extends substantially vertically from the fifth wheel to the frame, to an elevated position in which said link extends in a substantially horizontal position and the wheel base of the combination is increased.

7. A tractor-trailer combination comprising a tractor with a fifth wheel thereon having arms extending upward from the tractor, a semi-trailer having an elevated frame with means for suspending equipment therefrom, a lifting link pivotally connected at one end to the lower portion of the arms on the fifth wheel and extending substantially horizontally forward therefrom with its opposite end connected to the front end of the frame of the semi-trailer, an actuating link connected to the upper portion of said arms and extending downward therefrom with its lower end connected to said trailer frame, and means connected to said actuating link to move the lower end of the link and the trailer frame rearward from the tractor whereby the lifting link is swung upward from its horizontal position to raise the frame and lift equipment suspended therefrom.

8. A tractor-trailer combination comprising a tractor with a motor and a hydraulic pump driven by said motor, a fifth wheel on the tractor having arms extending upward from the tractor, a semi-trailer having an elevated frame with means for suspending equipment therefrom, a lifting link pivotally connected at one end to the lower portion of the arms on the fifth wheel and extending substantially horizontally forward therefrom with its opposite end connected to the front end of the frame of the semi-trailer, an actuating link connected to the upper portion of said arms and extending downward therefrom with its lower end connected to said trailer frame, hydraulic means connected to said pump and operable by fluid therefrom to move the lower end of the actuating link and the trailer frame rearwardly from the tractor whereby said lifting link is swung upward from its horizontal position to raise the trailer frame and lift equipment suspended therefrom.

MAURICE WALTER.